United States Patent [19]

Sargisson

[11] 4,075,833
[45] Feb. 28, 1978

[54] VARIABLE AREA INLET FOR A GAS TURBINE ENGINE

[75] Inventor: Donald Farley Sargisson, Cincinnati, Ohio

[73] Assignee: General Electric Company, Lynn, Mass.

[21] Appl. No.: 646,075

[22] Filed: Jan. 2, 1976

[51] Int. Cl.² .................. F02K 3/06; F02K 11/00
[52] U.S. Cl. .............................. 60/262; 60/39.31; 137/15.1; 181/214
[58] Field of Search ............ 60/262, 271; 181/33 HA; 137/15.1, 15.2; 239/265.37, 265.39, 265.41

[56] References Cited

U.S. PATENT DOCUMENTS

| | | | |
|---|---|---|---|
| 2,971,331 | 2/1961 | Silverman et al. | 137/15.1 |
| 2,984,068 | 5/1961 | Eatock | 239/265.37 |
| 2,995,010 | 8/1961 | Arscott | 239/265.39 |
| 3,046,730 | 7/1962 | Petren | 239/265.39 |
| 3,237,864 | 3/1966 | Taylor et al. | 239/265.41 |
| 3,289,946 | 12/1966 | Lennard | 239/265.39 |
| 3,610,262 | 10/1971 | Wise | 137/15.1 |
| 3,618,699 | 11/1971 | Evans | 181/33 HA |
| 3,821,999 | 7/1974 | Guess et al. | 181/33 HA |
| 3,831,376 | 8/1974 | Moorehead | 239/265.37 |
| 3,883,095 | 5/1975 | Fletcher | 137/15.1 |
| 3,937,238 | 2/1976 | Stewart et al. | 137/15.1 |

Primary Examiner—Robert E. Garrett
Attorney, Agent, or Firm—Henry J. Policinski; Derek P. Lawrence

[57] ABSTRACT

The inlet of a gas turbine is provided with a mechanism for varying the throat area which may be selectively adjusted to maintain the velocity of an incoming air stream at a high level during aircraft takeoff and climbout to thereby reduce forward propagated noise.

4 Claims, 5 Drawing Figures

VARIABLE AREA INLET FOR A GAS TURBINE ENGINE

CROSS-REFERENCE TO RELATED APPLICATION

This application is being filed concurrently with U.S. Application Ser. No. 646,326 filed by D. F. Sangisson on Jan. 2, 1976, assigned to the assignee of the present invention which discloses a long duct mixed flow gas turbine engine of which the present invention may be a part.

BACKGROUND OF THE INVENTION

The present invention relates to improvements in gas turbine engines and nacelles therefor and, more particularly, to a novel gas turbofan engine which exhibits lower noise levels, improved fuel consumption, greater reliability, easier maintainability, easier replaceability, and improved thrust reversal over prior art gas turbofan engines.

Considerable attention has been devoted to developing a gas turbine engine which is quiet, clean and economical to operate. Significant improvement has been made in fuel consumption and noise levels of gas turbine engines over the past decade. Accordingly, a new family of high bypass, large diameter turbofans have recently been introduced into service. These engines have demonstrated noise levels and fuel consumption characteristics far superior to prior art gas turbine engines. The reduced noise levels of such high bypass turbofan engines is attributable to the reduced exit velocities of airflow pressurized by the fan. Though far more quiet than prior art gas turbofan engines, the recently introduced high bypass turbofan engines have higher noise levels than are desired. Therefore, Government regulatory agencies are applying ever more stringent requirements on newly certificated commercial aircraft. The objectionable noise levels in such engines generally result from the high tip speeds of the large diameter fan blades required to efficiently pressurize the bypass duct flow. This is in contrast to the turbojet or low bypass ratio turbofan engines in which the dominant noise source results from the discharge of the hot core gas stream through its propulsive nozzle.

It is, therefore, a primary object of the present invention to provide an economical, easily maintained gas turbine engine with improved noise levels.

SUMMARY OF THE INVENTION

This and other objects are achieved in the preferred embodiment of this invention in which a gas turbofan engine is provided with an outer nacelle which forms both the engine inlet and exhaust. The nacelle is spaced apart from a core engine to define an annular bypass duct therebetween. The incoming air stream is pressurized by a fan disposed in the inlet and thereafter divided between the core engine and bypass duct. A low pressure turbine is provided downstream of the core engine to supply rotational energy to the fan. A convoluted lobed mixer having a plurality of circumferentially spaced alternating cold chutes in flow communication with the bypass duct and hot chutes in flow communication with the core engine is provided downstream of the low pressure turbine to intermix the core engine and bypass duct exhaust streams. The mixed stream is thereafter discharged from a fixed area nozzle formed integral with the outer nacelle.

In order to reduce noise levels, the engine of this invention is provided with a variable geometry mechanism for controlling the cross-sectional flow area of the inlet throat. The variable geometry mechanism may be configured to maintain the throat velocity of the inlet airflow at a sufficiently high level during aircraft takeoff and climbout such that forward propagation of inlet noise is significantly reduced.

BRIEF DESCRIPTION OF THE DRAWINGS

The invention may be better understood upon reading the following description of the preferred embodiment in conjunction with the accompanying drawings in which.

DESCRIPTION OF THE PREFERRED EMBODIMENT

Figure 1:
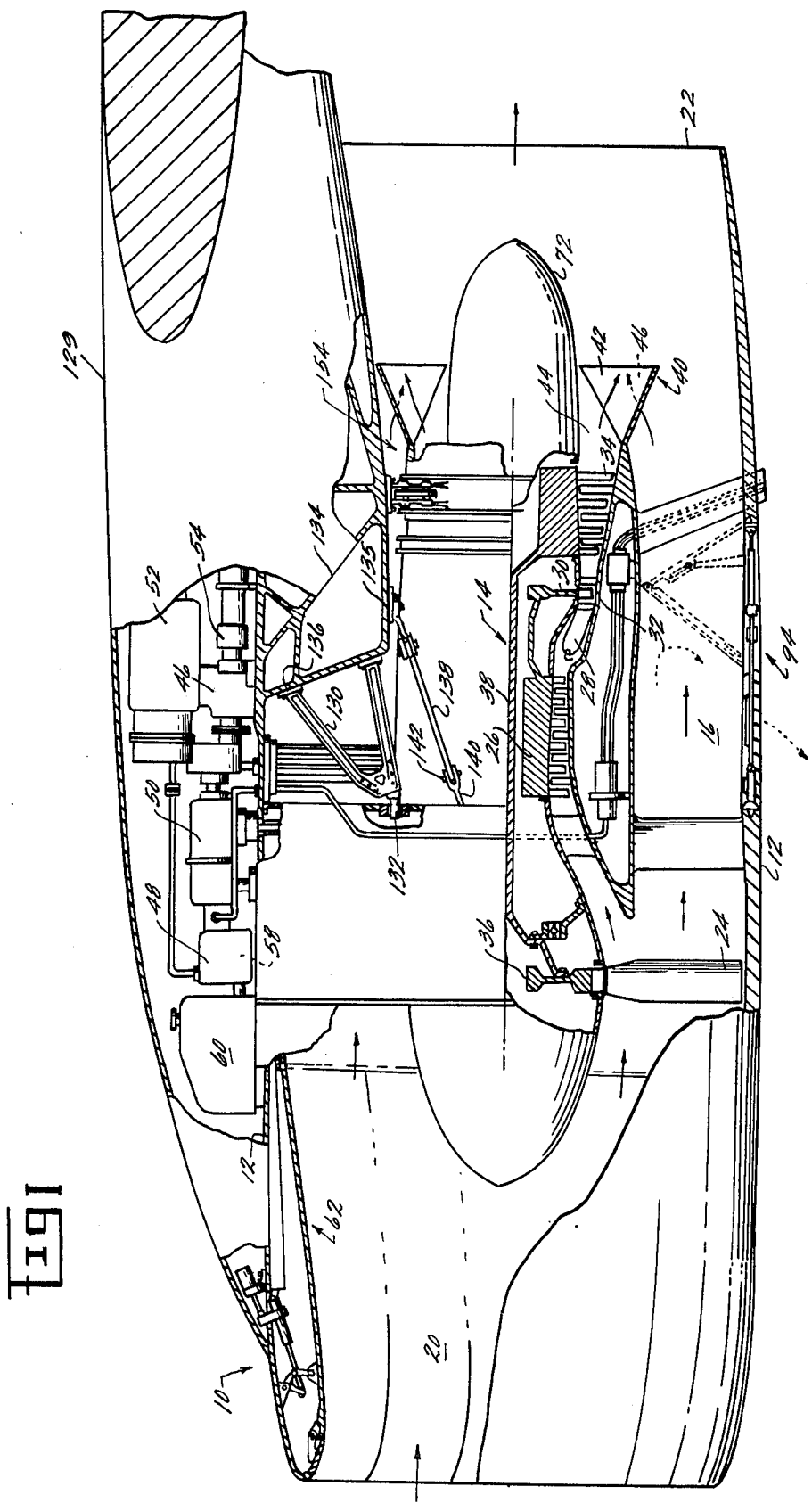
FIG. 1 is a cross-sectional view of a gas turbine engine incorporating the variable area inlet of this invention.
Figure 2:
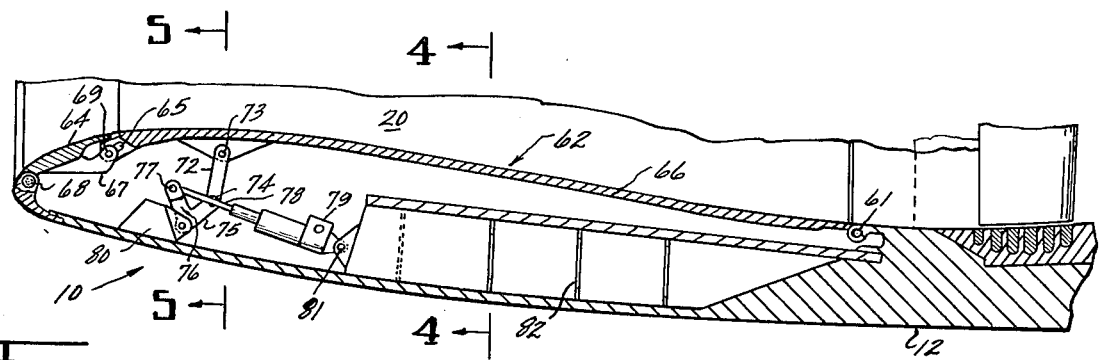
FIG. 2 is an enlarged fragmented view of a portion of the inlet of the engine of FIG. 1 in one mode of operation.
Figure 3:
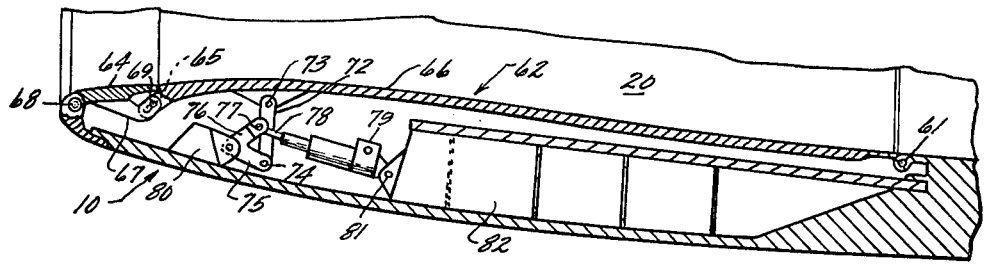
FIG. 3 is an enlarged fragmented view of a portion of the inlet of FIG. 2 in a different mode of operation.

Referring to FIGS. 1 through 3, there is shown a mixed flow gas turbine engine 10 having an outer casing or nacelle 12 spaced apart from an inner core engine shown generally at 14 so as to define an annular bypass duct 16 therebetween. The outer nacelle 12 extends upstream of the core engine 14 to define an inlet 20 to the engine 10 and downstream of the core engine 14 to define a fixed area exhaust nozzle 22 for the engine 10. Disposed in the engine inlet 20 is a fan for pressurizing the total inlet airflow.

In operation, the fan 24 pressurizes the incoming air stream which is thereafter divided between the core engine 14 and the bypass duct 16. The airflow to the core engine 14 is further compressed by a core engine compressor 26 to provide a highly pressurized air stream for supporting combustion of fuel in a combustor 28. The hot gas stream generated by the combustor 28 is used to drive a high pressure turbine 30 which is connected to the rotor of the compressor 26. The hot gas stream discharged from the high pressure turbine 30 passes through an outwardly curved annular duct 32 to a low pressure turbine 34, which is connected to and drives the rotor 36 of the fan 24 through an upstream extending drive shaft 38. Disposed downstream and in flow communication with the low pressure turbine 34 and bypass duct 16 is a convoluted lobed mixer 40 circumscribing an exhaust plug 72 and having a plurality of circumferentially spaced alternating hot chutes 42 in flow communication with the low pressure turbine discharge nozzle 44 and cold chutes 46 in flow communication with the bypass duct 16. The combined flows are thereafter discharged through the fixed area nozzle 22 formed integral with the outer nacelle 12. The mixer 40 is generally of the type described in U.S. Pat. No. 3,508,403, which is designed to reduce aerodynamic pressure losses as the fan and hot gas streams commingle.

In order to provide for ease in service and accessibility of engine accessories, provision has been made for mounting the engine accessories exterior to the outer nacelle 12. Accordingly, most of the engine accessory components including the fuel pump 48, generator 50, starter 52, hydraulic pump 54, heat exchanger 46, ignition unit 58, and storage tank 60 are mounted exterior to the outer nacelle 12.

A cascaded thrust reverser shown generally at 94 is provided immediately aft of the engine fan frame.

Figure 4:
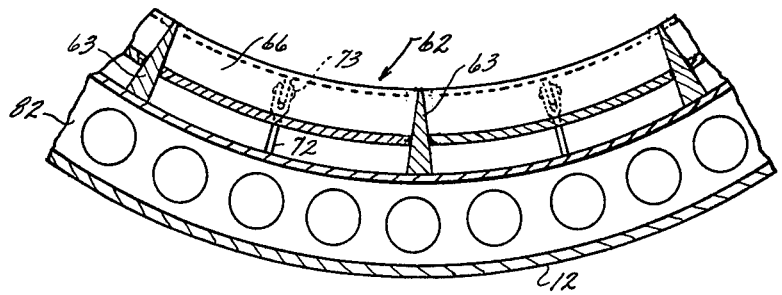
FIG. 4 is a cross-sectional view taken along the line 4—4 of FIG. 2.
Figure 5:
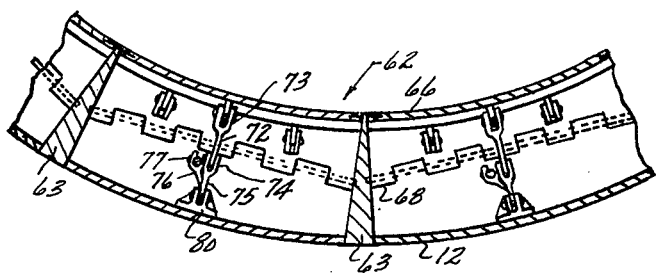
FIG. 5 is a cross-sectional view taken along the line 5—5 of FIG. 2.

In order to reduce fan noise during takeoff and climbout, the inlet 10 upstream of the fan 24 is provided with a variable geometry mechanism shown generally at 62 for changing the cross-sectional flow area of the throat of the inlet 20. The variable geometry mechanism 62 comprises a plurality of forward panels 64 separated by a plurality of circumferentially spaced wedge members 63, as best seen in FIG. 4, an pivotally mounted to the extreme upstream end of the nacelle 12 at hinge points 68. The variable geometry mechanism 62 further comprises a plurality of aft panels 66 also separated by wedge members 63 and pivotally mounted at their downstream end to the interior face of the nacelle 12 at hinge points 61. Each forward panel 64 includes a downstream extending arm 67 having a pin 69 secured thereto. The pin 69 slidingly and rotatably engages a tract 65 formed integral with the upstream end of a respective radially aligned aft panel 66. In order to actuate the variable position inlet, a plurality of actuating links 72 are provided, each having one end pivotally mounted to a plurality of brackets 73 formed integral with respective aft panels 66. The opposite ends of the links 72 are pivotally mounted at a plurality of hinge points 74 to arms 75 of bell crank levers 76. The other arms 77 of bell crank levers 76 are pivotally mounted to the actuaing arms 78 of a plurality of linear actuators 79 mounted to a plurality of brackets 81 attached to a supporting structure 82 formed integral with the nacelle 12. The bell crank levers 76 are pivotally mounted at the junction of arms 77 and 75 to respective bracket 80 formed integral with the nacelle 12 upstream of the brackets 81. This arrangement permits the hinged panels 64 and 66 to be moved by the actuators 79, bell crank levers 76, and links 72 to all positions between an increased inlet area position as illustrated in FIG. 3 to a decreased inlet area position as illustrated in FIG. 2 wherein the panels are spaced further away from the nacelle 12. In their decreased inlet area position the hinged panels 64 and 66 cooperate to reduce the cross-sectional flow area of the inlet 20 in order to accelerate the airflow therethrough and thereby reduce forward radiation of engine noise during aircraft takeoff and climbout. During aircraft cruise and landing, the hinged panels 64 and 66 may be maintained in the increased inlet area position. The hinged panels 64 and 66 may also be constructed of an acoustically absorbent material to further reduce inlet noise.

While the variable area inlet of this invention has been disclosed as incorporated into a gas turbofan engine of the long duct mixed flow type, it will be apparent to those skilled in the art that the variable area inlet of this invention has application to any gas turbine engine in which it is desired to regulate the velocity of the incoming air stream.

Engine noise is further suppressed by constructing the entire nacelle 12 of a thin wall honeycombed structure which is acoustically absorbent. Engine noise is even further reduced by providing an acoustically absorbent lining (not shown) on the exhaust plug 72.

Having described preferred embodiments of the present invention, though not exhaustive of all equivalents, it will be appreciated by those skilled in the art that many modifications, substitutions and changes may be made thereto without departing from the fundamental theme of the invention. Therefore, what is desired to be secured by Letters Patent is as follows.

What is claimed is:

1. A variable area inlet for a gas turbine engine which includes an outer nacelle circumscribing a core engine comprising a hinged wall assembly forming the interior face of the outer nacelle and extending from the upstream end of the inlet to a point upstream of the core engine said hinged wall assembly comprising:
    a plurality of circumferentially spaced acoustically absorbent panels pivotally mounted to the upstream end of the outer nacelle and separated by a plurality of circumferentially spaced wedge members,
    a plurality of circumferentially spaced acoustically absorbent aft panels separated by the wedge members, pivotally mounted at their upstream ends to the downstream end of axially aligned respective forward panels and having their downstream ends pivotally mounted to the interior of the nacelle, and
    actuating means for selectively moving the panels away from or toward the nacelle thereby to decrease or increase respectively the cross-sectional flow area of the inlet throat.

2. The variable area inlet of claim 1 wherein the gas turbine engine further comprises a fan disposed in the inlet intermediate the core engine and hinged wall assembly.

3. The gas turbine engine of claim 1 wherein the actuating means comprises a plurality of links each having one end pivotally mounted to a respective aft panel and the other end pivotally mounted to one arm of a bell crank lever which is pivotally mounted to the interior of the nacelle and wherein the other arm of the angle link is pivotally mounted to the actuating arm of a linear actuator secured to the interior of the nacelle downstream of the bell crank lever.

4. The variable area inlet of claim 1 wherein respective radially aligned forward and aft panels are joined by a pin formed integral with the downstream end of the forward panel which rotatably and slidably engages a track formed integral with the upstream end of the aft panel.

* * * * *